US008901049B2

(12) United States Patent
Yari et al.

(10) Patent No.: US 8,901,049 B2
(45) Date of Patent: *Dec. 2, 2014

(54) SLIDING MECHANISM AND FRICTION REDUCTION METHOD FOR THE SAME

(75) Inventors: Keisuke Yari, Ageo (JP); Sachiyo Ono, Kasukabe (JP); Masaru Iijima, Ageo (JP); Noriyoshi Tanaka, Fujimino (JP); Kenji Yamamoto, Tokyo (JP); Akihiro Kotaka, Tokyo (JP)

(73) Assignees: UD Trucks Corporation, Ageo-shi (JP); Adeka Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/993,136

(22) PCT Filed: Oct. 21, 2011

(86) PCT No.: PCT/JP2011/074272
§ 371 (c)(1),
(2), (4) Date: Jun. 11, 2013

(87) PCT Pub. No.: WO2012/081310
PCT Pub. Date: Jun. 21, 2012

(65) Prior Publication Data
US 2013/0266246 A1   Oct. 10, 2013

(30) Foreign Application Priority Data
Dec. 13, 2010 (JP) .................. 2010-276943

(51) Int. Cl.
*F16C 33/20* (2006.01)
*C10M 135/18* (2006.01)
(Continued)

(52) U.S. Cl.
CPC ............. *F16C 29/02* (2013.01); *C10M 135/18* (2013.01); *C10M 2219/068* (2013.01); *C10M*
(Continued)

(58) Field of Classification Search
USPC ................. 384/13; 508/100, 335, 363, 369
See application file for complete search history.

(56) References Cited

U.S. PATENT DOCUMENTS

2008/0146468 A1 * 6/2008 Konishi et al. ............... 508/109

FOREIGN PATENT DOCUMENTS

JP     H10-219267       8/1998
JP     2001-316686 A1   11/2001
(Continued)

OTHER PUBLICATIONS

International Search Report for International Application No. PCTJP2011/074272 dated Jan. 17, 2012.

*Primary Examiner* — Vishal Vasisth
(74) *Attorney, Agent, or Firm* — Kratz, Quintos & Hanson, LLP (57) ABSTRACT

The purpose of the present invention is to provide: a sliding member having a lubricating film formed on the sliding surface thereof, and capable of exhibiting friction-reducing performance; and a friction reduction method for the same. To that end, the present invention entails coating the sliding surface with a titanium nitride-based material (for example, titanium carbon nitride, titanium nitride, or titanium aluminum nitride), adding a molybdenum dithiocarbamate with molybdenum in the amount of 600-1000 ppm to diesel engine oil, setting the arithmetic mean roughness of the sliding member to 2-10 nm, and upon converting the Sommerfeld number viscosity to Pa·s, the speed to $s^{-1}$, and the load to mean Hertzian stress (Pa), then the lubrication conditions for use are within the range of $2.12365 \times 10^{-19}$ to $5.94509 \times 10^{-19}$.

8 Claims, 4 Drawing Sheets

(51) Int. Cl.
- *C10M 137/10* (2006.01)
- *F16C 33/10* (2006.01)
- *F16C 29/02* (2006.01)
- *C10M 169/04* (2006.01)
- *F16C 33/12* (2006.01)

(52) U.S. Cl.
CPC ............ *2203/1006* (2013.01); *C10M 169/04* (2013.01); *C10N 2240/102* (2013.01); *C10N 2230/06* (2013.01); *C10N 2280/00* (2013.01); *F16C 33/124* (2013.01); *F16C 33/1095* (2013.01); *C10N 2240/02* (2013.01)

USPC ........... 508/100; 508/335; 508/363; 508/369; 384/13

(56) References Cited

FOREIGN PATENT DOCUMENTS

| | | |
|---|---|---|
| JP | 2007-205564 A1 | 8/2007 |
| JP | 2009-114311 A1 | 5/2009 |

\* cited by examiner

SLIDING MECHANISM AND FRICTION REDUCTION METHOD FOR THE SAME

This application is a 371 of PCT/JP2011/074272, filed Oct. 21, 2011.

TECHNICAL FIELD

The present invention relates to a sliding mechanism comprising one sliding member (for example, a shaft) and the other sliding member (for example, bearing), and both members are lubricated by a lubricant, and friction-reducing technique in such a sliding mechanism.

BACKGROUND ART

When an iron series material such as steel is used as a sliding member, it has conventionally been known that an organic molybdenum lubricating oil additive such as molybdenum dithiocarbamate (MoDTC) which is a friction reduction agent exhibits low friction properties when it is added to a lubricant.

Here, in a lubricant (for example, engine oil) actually used in industry, various additives are contained. For example, an extreme pressure agent represented by zinc dialkyldithiophosphate (ZnDTP) or a detergent-dispersant forms a lubricating film at the sliding surfaces as in the lubricant. Therefore, the lubricating oil to which an organic molybdenum lubricating oil additive has been added cannot sufficiently form a lubricating film at the sliding surfaces.

That is, various kinds of additives other than the additives for the lubricating oil compete for forming the lubricating film, so that even when the organic molybdenum lubricating oil additive is added, there are cases where the effects cannot be obtained or the effects cannot sufficiently be exhibited.

In particular, since diesel engine oil contains a detergent-dispersant with a large amount, the phenomenon markedly occurs that the effects cannot be obtained or the effects cannot sufficiently be exhibited, although the organic molybdenum lubricating oil additive is added, As the other prior art, for example, a technique in which zinc dialkyl dithio compound and a lubricant are mixed has been proposed (see Patent Literature 1).

However, an object of such a prior art is to reduce the friction coefficient in the range of a low to medium temperature, and it does not intend to solve the above-mentioned problems.

CITATION LIST

Patent Literature

Patent Literature 1: Japanese Patent Application Non-examined Publication Gazette No. 1998-219267 (JPA 1998-219267)

SUMMARY OF INVENTION

Problems to be Solved by the Invention

The present invention has been proposed in view of the problems of the prior art as mentioned above, and an object is to provide a sliding member in which a lubricating film is formed at the sliding surfaces whereby friction-reducing property can be exhibited.

Solution to Problem

The inventors have intensively studied, and as a result, they have found that molybdenum dithiocarbamate (MoDTC) is added even to a general diesel engine oil, and at least one of the sliding members is coated by a titanium nitride-based material (for example, titanium carbon nitride, titanium nitride or titanium nitride aluminum), a friction coefficient is reduced under certain conditions whereby low friction performance can be exhibited.

The present invention has been created based on such a fact.

The sliding mechanism of the present invention is characterized in that it is used under the lubricating conditions in which a Sommerfeld number (S=viscosity×speed÷load) is in the range of $2.12365 \times 10^{-19}$ to $5.94509 \times 10^{-19}$ upon converting the viscosity thereof to Pa·s, the speed to $s^{-1}$ and the load to mean Hertzian stress (Pa), at least one sliding surface of the sliding members made of a steel material is coated by a titanium nitride-based material, diesel engine oil to which molybdenum dithiocarbamate (MoDTC) is added with molybdenum in the amount of 600 ppm to 1000 ppm is interposed between the sliding members as a lubricant, and that an arithmetic mean roughness of the sliding members is in the range of 2 to 10 nm.

A method for reducing a friction of a sliding mechanism of the present invention comprises a step for coating a titanium nitride-based material to at least one sliding surface of the sliding members made of a steel material, a step for adding molybdenum dithiocarbamate (MoDTC) with molybdenum in the amount of 600 ppm to 1000 ppm to diesel engine oil, a step for setting the arithmetic mean roughness of the sliding member(s) to 2 to 10 nm, and a step for setting the lubrication conditions in which the Sommerfeld number (S=viscosity×speed÷load) is in the range of $2.12365 \times 10^{-19}$ to $5.94509 \times 10^{-19}$ upon converting the viscosity thereof to Pa·s, the speed to $s^{-1}$ and the load to mean Hertzian stress (Pa).

In the present invention, said titanium nitride-based material is preferably titanium nitride aluminum (TiAlN).

It is also preferred that said titanium nitride-based material is titanium nitride and the arithmetic mean roughness of the sliding member(s) is 2 to 4 nm.

Or else, said titanium nitride-based material is preferably titanium carbon nitride.

Advantageous Effects of Invention

According to the present invention having the above-mentioned constitutions, friction performances are markedly lowered although it has a sliding surface coated by a titanium nitride-based material (for example, titanium carbon nitride, titanium nitride or titanium nitride aluminum) which increases a friction coefficient in a general diesel engine oil.

Here, by setting the lubricating conditions in the range as mentioned above, it has been confirmed that good lubricating performances can be performed in the region of a boundary friction at which a lubricating film is formed between the sliding members. That is, according to the present invention, although it is diesel engine oil containing a large amount of a detergent-dispersant, when molybdenum dithiocarbamate (MoDTC) is added thereto, the effect can be sufficiently exhibited.

DESCRIPTION OF EMBODIMENTS

In the following, the embodiments of the present invention are explained by referring to the attached drawings.

As the embodiments of the present invention, in a bearing structure, for example, one of the sliding members is a shaft, and the peripheral surface (the sliding surface) of said shaft was coated by titanium carbon nitride (TiAlN) which is a titanium nitride-based material according to the physical vapor deposition (PVD) technique. The arithmetic mean roughness of the shaft surface was made 5.0 nm.

On the other hand, as the other sliding member, a bearing (at least inner race) was made from high-carbon chromium bearing steel (SUJ2).

As a lubricant, diesel engine oil of Japanese Automotive Standards Organization "DH-2", to which molybdenum dithiocarbamate (MoDTC) with molybdenum in the amount of 700 ppm had been added, was used.

Such bearing was used under the sliding conditions (mixed lubricating region) of the Sommerfeld number of $2.12365 \times 10^{-19}$. Here, the Sommerfeld number is a numerical value in which the viscosity is converted to Pa·s, the speed to $s^{-1}$, and the load to mean Hertzian stress (Pa).

As a result, such bearing was markedly decreased in the friction coefficient as compared with the case where the sliding both members are high-carbon chromium bearing steel (SUJ2), lubricating with diesel oil (DH-2) to which no molybdenum dithiocarbamate (MoDTC) had been added and used under the sliding conditions (mixed lubricating region) of the Sommerfeld number of $2.12365 \times 10^{-19}$.

Experimental Example 1

Figure 1:
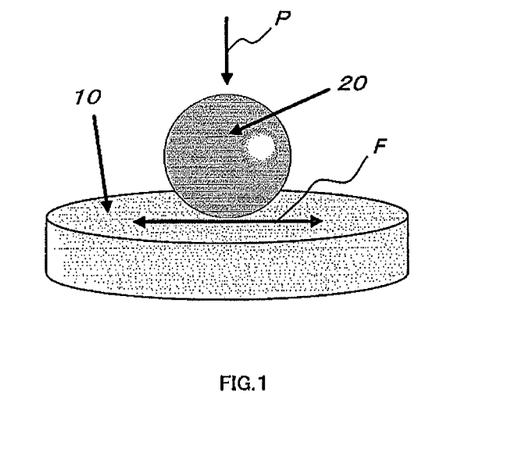
FIG. 1 This is a conceptual drawing of a ball-on-disk type high-frequency reciprocating rig being used in Experimental Examples.

Experimental Example 1 was carried out by using a ball-on-disk system high-frequency reciprocating rig (HFRR) as shown in FIG. 1.

In FIG. 1, a ball 20 made of high-carbon chromium bearing steel (SUJ2) was placed on a plate shaped substrate 10 (arithmetical mean roughness: 5.0 nm), and the substrate 10 and the ball 20 were lubricated by diesel engine oil.

In FIG. 1, the arrow P is a load loaded to the ball 20, and the arrow F is a direction of acting the friction force.

With regard to the load P, it was set to 1000 g or 400 g so that the lubricating conditions in Experimental Example 2 mentioned below are aligned as equal intervals as possible.

The substrates 10 were categorized in two cases in one of which cases the substrate is constituted by high-carbon chromium bearing steel (SUJ2) and in the other one of which cases titanium nitride aluminum was coated on the ball 20 side (sliding surface side) of high-carbon chromium bearing steel (SUJ2).

With regard to the lubricant, two kinds of diesel engine oils {diesel engine oil (hereinafter referred to the reference "CD") with the American Petroleum Institute standard of "CD", and diesel engine oil (hereinafter referred to the reference "VDS-4 (DH-2)") which is "VDS-4" according to the original standard of Volvo group to which the applicant belongs, and is "DH-2" according to Japanese Automotive Standards Organization: both are general diesel engine oils} were used. Also, they were categorized in two cases in one of which cases molybdenum dithiocarbamate (MoDTC) with molybdenum in the amount of 700 ppm had been added and the other one of which cases no molybdenum dithiocarbamate (MoDTC) had been added.

Experiments were carried out in total of eight kinds of samples (No. 1 to No. 8 in the following Table 1) by combining the substrate and the lubricant.

The combinations of the material of the substrate 10 and the lubricant are shown in Table 1 below with regard to eight kinds of the respective samples.

TABLE 1

| test No. | Ball test piece | Disk test piece | | Lubricating oil | |
|---|---|---|---|---|---|
| | | Substrate | Coating | Kind | Friction controller |
| 1 | SUJ2 | SUJ2 | — | CD | — |
| 2 | SUJ2 | SUJ2 | TiAlN | CD | — |
| 3 | SUJ2 | SUJ2 | — | CD | MoDTC |
| 4 | SUJ2 | SUJ2 | TiAlN | CD | MoDTC |
| 5 | SUJ2 | SUJ2 | — | VDS-4 (DH-2) | — |
| 6 | SUJ2 | SUJ2 | TiAlN | VDS-4 (DH-2) | — |
| 7 | SUJ2 | SUJ2 | — | VDS-4 (DH-2) | MoDTC |
| 8 | SUJ2 | SUJ2 | TiAlN | VDS-4 (DH-2) | MoDTC |

Figure 2:
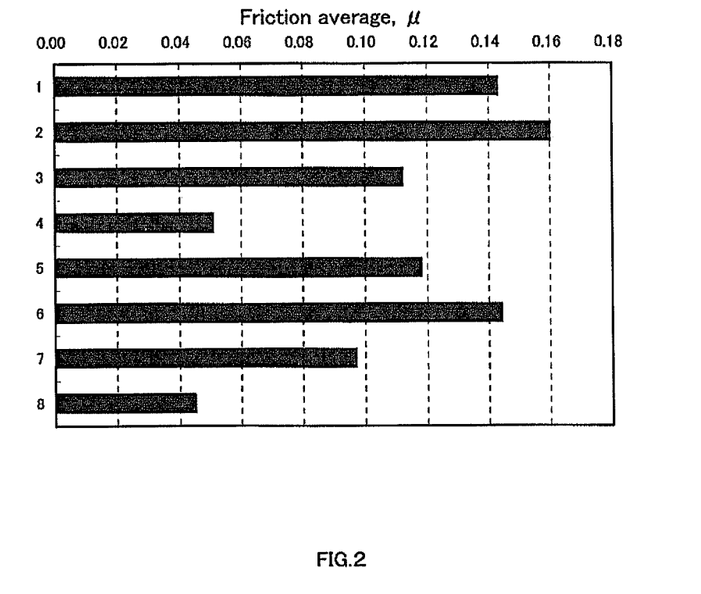
FIG. 2 This is a figure showing friction coefficients of eight kinds of samples used in Experimental Example 1 comparing to each other.

The test results of Experimental Example 1 using the ball-on-disk system high-frequency reciprocating rig (HFRR) as shown in FIG. 1 are shown in FIG. 2.

The horizontal axis of FIG. 2 shows a friction coefficient μ and the vertical axis shows the sample No.

In FIG. 2, when Samples No. 1 and No. 2, and Sample No. 5 and Sample No. 6 are compared to each other, it can be understood that, in either of two kinds of diesel engines, if no molybdenum dithiocarbamate (MoDTC) is added, the samples (No. 2 and No. 6) in which titanium nitride aluminum has been coated to the substrate 10 are larger friction (μ is large) and inferior in the lubricating performances to the samples (No. 1 and No. 5) in which titanium nitride aluminum has not been coated to the substrate 10.

From the results, it can be understood that the lubricating performance is lowered when titanium nitride aluminum has been coated in the case (general case) where molybdenum dithiocarbamate has not been added to diesel engine.

To the contrary, the results of Sample No. 4 and No. 8 are compared with the results of other samples in FIG. 2, it can be understood that the friction becomes markedly small (μ is markedly small) and the lubricating performances are remarkably improved when molybdenum dithiocarbamate (MoDTC) has been added to the diesel engine and the substrate 10 has been coated by titanium nitride aluminum.

That is, from Experimental Example 1, it could be confirmed that the friction becomes markedly small ($\mu$ is markedly small) and the lubricating performances are remarkably improved when molybdenum dithiocarbamate (MoDTC) has been added to the diesel engine and one of the sliding members is coated by titanium nitride aluminum.

In other words, from Experimental Example 1, even when a general diesel engine oil which contains a large amount of a detergent dispersant is used as a lubricant, it can be estimated that the detergent dispersant does not inhibit the diesel engine oil to which molybdenum dithiocarbamate (MoDTC) has been added to form a lubricating film, and a lubricating film of the diesel engine oil to which molybdenum dithiocarbamate (MoDTC) has been added is formed and exhibited the lubricating performances, whereby the friction coefficient $\mu$ is lowered.

Incidentally, low friction performances when the conventionally known molybdenum dithiocarbamate (MoDTC) has been added are clear by comparing Samples No. 1 and No. 3, No. 5 and No. 7 to each other.

Figure 3:
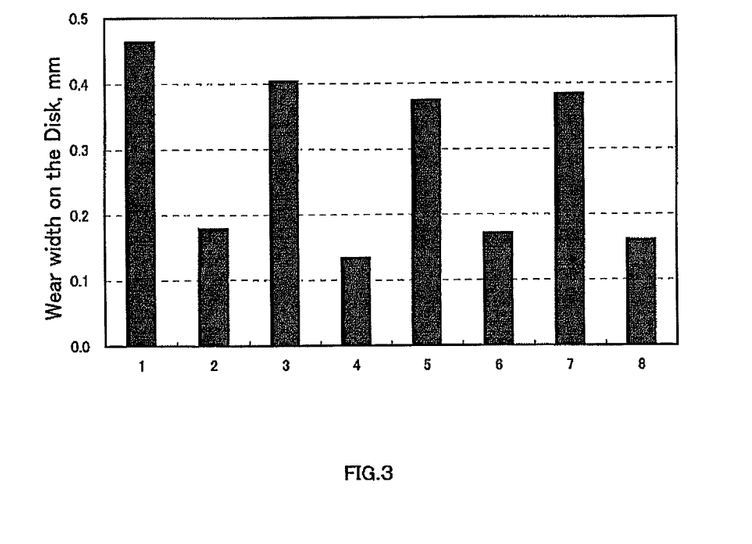
FIG. 3 This is a figure showing wear amounts of eight kinds of samples of Experimental Example 1 by comparing to each other.

FIG. 3 shows wear amounts generated at the substrate 10 side, after Experimental Example 1 was carried out, by comparison.

At the vertical axis of FIG. 3, a width (mm) of wear scar generated at the substrate 10 side, and at the horizontal axis, Sample No. is shown. Here, the width (mm) of wear scar generated at the substrate 10 side is proportional to the wear amount.

In FIG. 3, when the samples (No. 2, No. 4, No. 6 and No. 8) in which titanium nitride aluminum has been coated are compared with the samples (No. 1, No. 3, No. 5 and No. 7) in which it has not been coated, the wear amounts are clearly lowered.

From FIG. 3, it is clear that the wear resistance is improved when titanium nitride aluminum is coated.

Experimental Example 2

Figure 4:
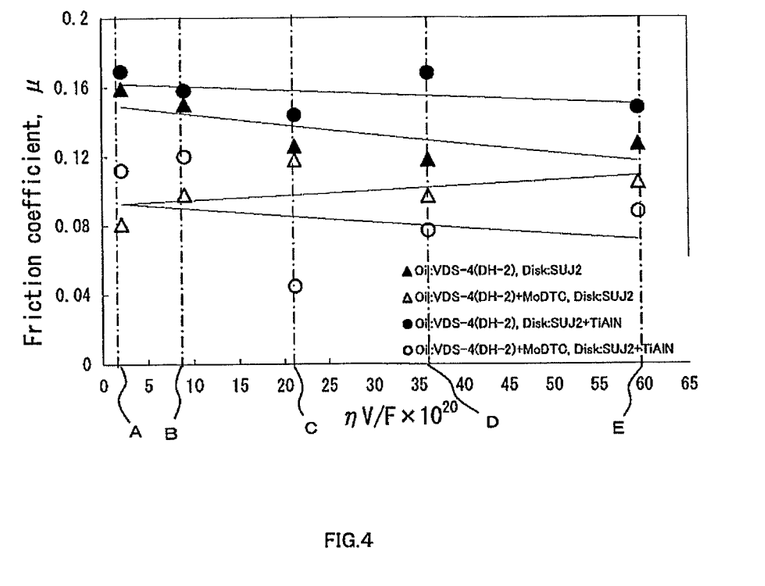
FIG. 4 This is a figure showing results of Experimental Example 2 and showing a relation-ship between the lubricating conditions and the friction coefficients.

In Experimental Example 2, a lubricant to which no molybdenum dithiocarbamate (MoDTC) is added (in FIG. 4, it is shown as VDS4 (DH-2): "DH-2" is a standard of Japanese Automotive Standards Organization) and a lubricant to which molybdenum dithiocarbamate with molybdenum in the amount of 700 ppm has been added (VDS4 (DH-2)+MoDTC) were prepared. The lubricant {VDS4 (DH-2)} used with regard to FIG. 4 is a usual diesel engine oil.

A substrate constituted by a high-carbon chromium bearing steel (SUJ2) to which no titanium nitride aluminum has been coated and a substrate (TiAlN) to which titanium nitride aluminum has been coated were prepared.

As a result, the following four kinds of samples were prepared.

No. 2-1 (plot "▲" in FIG. 4): Combination of a lubricant {VDS4 (DH-2)} to which no molybdenum dithiocarbamate has been added and a substrate (SUJ2) to which no titanium nitride aluminum has been coated.

No. 2-2 (plot "Δ" in FIG. 4): Combination of a lubricant {VDS4 (DH-2)+MoDTC} to which molybdenum dithiocarbamate has been added and a substrate to which no titanium nitride aluminum has been coated.

No. 2-3 (plot "●" in FIG. 4): Combination of a lubricant {VDS4 (DH-2)} to which no molybdenum dithiocarbamate has been added and a substrate (TiAlN) to which titanium nitride aluminum has been coated.

No. 2-4 (plot "○" in FIG. 4): Combination of a lubricant {VDS4 (DH-2)+MoDTC} to which molybdenum dithiocarbamate has been added and a substrate (TiAlN) to which titanium nitride aluminum has been coated.

By changing the lubricating conditions, low friction performances were compared in the same manner as in Experimental Example 1.

The lubricating conditions were determined in the range of a mixed lubrication region using the Sommerfeld number as a standard.

The Sommerfeld number S is a non-dimensional amount like S=viscosity×speed÷load.

The results of Experimental Example 2 are shown in FIG. 4. In FIG. 4, the vertical axis shows a friction coefficient $\mu$, and the horizontal axis shows the Sommerfeld number S.

In FIG. 4, the term regarding the viscosity in the Sommerfeld number S is converted into "Pa·s", the term regarding the speed into "the frequency (s-1)" and the term regarding the load into "the mean Hertzian stress (Pa)", whereby it is obtained.

At the vertical axis of FIG. 4,
the numeral A is the portion where the Sommerfeld number $S=2.12365\times10^{-20}$,
the numeral B is the portion where the Sommerfeld number $S=9.03526\times10^{-20}$,
the numeral C is the portion where the Sommerfeld number $S=2.12365\times10^{-19}$,
the numeral D is the portion where the Sommerfeld number $S=3.6141\times10^{-19}$, and
the numeral E is the portion where the Sommerfeld number $S=5.94509\times10^{-19}$.

Experimental Example 2 was carried out with regard to the lubricating conditions corresponding to the Sommerfeld numbers S shown by the numerals A to E, the lubricating conditions in which the Sommerfeld number S is larger than that of the numeral E and the lubricating conditions in which the Sommerfeld number S is smaller than that of the numeral A.

As mentioned by referring to FIG. 2, when the case (general case) where molybdenum dithiocarbamate is not added to the lubricant, the lubricating performances are lowered when chromium nitride is coated. On the other hand, when molybdenum dithiocarbamate is added to the lubricant, the friction becomes markedly small ($\mu$ is markedly small) and the lubricating performances are remarkably improved when titanium nitride aluminum is coated.

In FIG. 4, in the range of the Sommerfeld numbers S shown by C to E, the friction coefficient $\mu$ (plot "○" in FIG. 4) of the sample No. 2-4 is lower than the friction coefficient $\mu$ (plot "▲" in FIG. 4) of the sample No. 2-1, the friction coefficient $\mu$ (plot "Δ" in FIG. 4) of the sample No. 2-2 and the friction coefficient $\mu$ (plot "●" in FIG. 4) of the sample No. 2-3, so that it could be confirmed that the low friction performances in the combination of the lubricant to which molybdenum dithiocarbamate had been added and the titanium nitride aluminum coating has been exhibited.

According to the experiment carried out by the inventor, when the Sommerfeld numbers S is smaller than "$2.12365\times10^{-19}$" (in FIG. 4, the left side region than the portion shown by the numeral C), the friction coefficient $\mu$(plot "A" in FIG. 4) of the sample No. 2-2 is lower than the friction coefficient $\mu$ (plot "○" in FIG. 4) of the sample No. 2-4.

That is, according to the experiment carried out by the inventor, the lubricating conditions in which low friction performances have been confirmed in combination of the lubricant to which molybdenum dithiocarbamate had been added and the titanium nitride aluminum coating were only the region in which the Sommerfeld number S was larger than "2.12365×10$^{-19}$" (the right side region than the numeral C in FIG. 4).

It can be estimated that if the Sommerfeld number S is smaller than "2.12365×10$^{-19}$", the properties in the category of dry friction causing solid contact would be strongly reflected than that in the category of boundary friction at which the lubricant forms a lubricating film.

In FIG. 4, as clearly seen from the comparison of the plot at the numeral C, the plot at the numeral D and the plot at the numeral E, the difference between the plot (○) of the sample No. 2-4 and the plots (▲, Δ and ●) of the samples No. 2-1, 2-2 and 2-3 is small.

According to the experiment carried out by the inventor, in the region of the Sommerfeld numbers S larger than "5.94509×10$^{-19}$" (the right side region than the numeral E in FIG. 4), the difference between the plot (○) of the sample No. 2-4 and the other plots (▲, Δ and ●) of the samples No. 2-1, 2-2 and 2-3 is smaller.

In other words, according to the experiment carried out by the inventor, the lubricating conditions in which low friction performances have been confirmed in combination of the lubricant to which molybdenum dithiocarbamate had been added and the titanium nitride aluminum coating were the region in which the Sommerfeld number S was smaller than "5.94509×10$^{-19}$" (the left side region than the numeral E in FIG. 4).

If the Sommerfeld number S is larger than "5.94509×10$^{-19}$", it would be belonging to the category of the so-called "fluid friction", so that it can be estimated that the low friction performances in combination of the lubricant to which molybdenum dithiocarbamate had been added and the titanium nitride aluminum coating could not be performed. When it belongs to the category of the fluid friction, a sufficient amount of the lubricant exists between the sliding surfaces but no lubricant film is formed.

From Experimental Example 2, it can be confirmed that the low friction performances in combination of the lubricant to which molybdenum dithiocarbamate had been added and the titanium nitride aluminum coating are performed in the range of the Sommerfeld number S of 2.12365×10$^{-19}$≤S≤5.94509×10$^{-19}$.

Experimental Example 3

By using the lubricant (VDS4 10W30+MoDTC) to which molybdenum dithiocarbamate had been added and the substrate (TiAlN) on which titanium nitride aluminum had been coated, whether the low friction performances are performed or not was tested in the same conditions as in Experiment Example 1 except for making the Sommerfeld number S "2.12365×10$^{-19}$" and changing the amount of the molybdenum dithiocarbamate (MoDTC) in the range of 500 to 1100 ppm with molybdenum amount of to each 100 ppm.

Experimental results of Experimental Example 3 are shown in the following Table 2.

TABLE 2

| | MoDTC added amount (ppm) | | | | | |
|---|---|---|---|---|---|---|
| | 500 | 600 | 700 | 800 | 900 | 1000 | 1100 |
| Low friction performance | x | Δ | ○ | ○ | ○ | ○ | ○ |

In Table 2, "○" shows that the low friction performances were confirmed as compared with the case where no molybdenum dithiocarbamate had been added. "x" shows that no low friction performance was confirmed.

In Table 2, the low friction performances were shown by "Δ" when the added amount of molybdenum dithiocarbamate (MoDTC) is set to 600 ppm in the molybdenum amount. This means that the low friction performances were performed but they were inferior to the low friction performances in the cases of 700 to 1000 ppm in the molybdenum amount.

It was confirmed by Experiment Example 3 that if the added amount of molybdenum dithiocarbamate is a little, the friction decreasing effect was insufficient and it should be added 600 ppm or more as the molybdenum amount.

In Table 2, the friction coefficient μ in the case where the added amount of molybdenum dithiocarbamate was 1000 ppm in terms of the molybdenum amount and the friction coefficient μ in the case where the added mount was 1100 ppm in terms of the molybdenum amount were not so different from each other. It has been well known that the characteristics of the friction-lowering effect by the lubricant and the added amount of molybdenum dithiocarbamate cannot be obtained in increasing the friction-lowering effect if the added amount of molybdenum dithiocarbamate exceeds a predetermined value, and from Experiment Example 3, it can be confirmed that such a predetermined value is 1000 ppm or so in terms of the molybdenum amount.

In other words, from Experiment Example 3, the friction-lowering effect can be confirmed with the added amount of molybdenum dithiocarbamate with of molybdenum in the amount of 600 to 1000 ppm without causing increase in the cost.

Experimental Example 4

By using the lubricant {VDS4 (DH-2)+MoDTC} to which molybdenum dithiocarbamate had been added and the substrate (TiAlN) on which titanium nitride aluminum had been coated, whether the low friction performances are performed or not was tested in the same conditions as in Experiment Example 1 except for making the Sommerfeld number S "2.12365×10$^{-19}$", adding an amount of the molybdenum dithiocarbamate (MoDTC) with molybdenum in the amount of 700 ppm and changing the arithmetic mean roughness of the substrate 10 in the range of 1 to 4 nm to each 0.5 nm.

Experimental results of Experimental Example 4 are shown in the following Table 3.

TABLE 3

| | Arithmetic mean roughness | | | | | | |
|---|---|---|---|---|---|---|---|
| | 1.0 | 1.5 | 2.0 | 2.5 | 3.0 | 3.5 | 4.0 |
| Low friction performance | — | — | ○ | ○ | ○ | ○ | ○ |

In Table 3, "○" shows that the friction coefficient was confirmed to be sufficiently low, and "–" shows that measurement of the friction coefficient could not be carried out.

If the arithmetic mean roughness of the substrate 10 is smaller than 2 nm, If the arithmetic mean roughness of the substrate 10 is smaller than 2 nm, it is estimated that a lubricant condition is in the category of fluid friction, and that measurement of the friction coefficient cannot be carried out by the device as shown in FIG. 1 in such the lubricant condition.

In other words, it can be confirmed by Experimental Example 4 that the lubricant does not belong to the category of the boundary friction which forms the lubricating film between the sliding members otherwise the arithmetic mean average roughness of the substrate 10 is 2 nm or more.

Experimental Example 5

By using the lubricant {VDS4 (DH-2)+MoDTC} to which molybdenum dithiocarbamate had been added and the substrate (TiAlN) on which titanium nitride aluminum had been coated, whether the low friction performances are performed or not was tested in the same conditions as in Experiment Example 1 except for making the Sommerfeld number S "$2.12365 \times 10^{-19}$", adding an amount of the molybdenum dithiocarbamate (MoDTC) with molybdenum in the amount of 700 ppm and changing the arithmetic mean roughness of the substrate 10 in the range of 8.0 to 11.0 nm to each 0.5 nm.

Experimental results of Experimental Example 5 are shown in the following Table 4.

TABLE 4

| | Arithmetic mean roughness | | | | | | |
|---|---|---|---|---|---|---|---|
| | 8.0 | 8.5 | 9.0 | 9.5 | 10.0 | 10.5 | 11.0 |
| Low friction performance | ○ | ○ | ○ | ○ | ○ | x | x |

In Table 4, "○" shows that the friction coefficient was confirmed to be sufficiently low, and "x" shows that the friction coefficient was large.

If the arithmetic mean roughness of the substrate 10 is larger than 10.0 nm, it can be estimated that it could not operate as a sliding member because unevenness of the surface is large.

In other words, it can be confirmed by Experimental Example 5 that the sliding members do not operate in the condition in which the lubricant forms a lubricating film between the sliding members, otherwise the arithmetic mean average roughness of the substrate 10 is 10.0 nm or less.

Next, the second embodiment of the present invention is explained.

In the second embodiment, in the bearing structure, for example, one of the sliding members is a shaft, and titanium nitride (TiN) was coated on the peripheral surface (sliding surface) of said shaft by the physical vapor deposition (PVD) technique.

The arithmetic mean roughness of the shaft surface was made 3.0 nm.

On the other hand, as the other sliding member, a bearing (at least inner race) was made from high-carbon chromium bearing steel (SUJ2).

As a lubricant, diesel engine oil of Japanese Automotive Standards Organization "DH-2" to which 700 ppm of molybdenum dithiocarbamate (MoDTC) had been added in terms of a molybdenum amount was used.

Such bearing was used under the sliding conditions (mixed lubricating region) of the Sommerfeld number of $2.12365 \times 10^{-19}$. Here, the Sommerfeld number is a numerical value in which the viscosity is converted to Pa·s, the speed to $s^{-1}$, and the load to mean Hertzian stress (Pa).

As a result, such bearing was markedly decreased in the friction coefficient as compared with the case where the sliding both members are high-carbon chromium bearing steel (SUJ2), lubricating with diesel oil (DH-2) to which no molybdenum dithiocarbamate (MoDTC) had been added and used under the sliding conditions (mixed lubricating region) of the Sommerfeld number of $2.12365 \times 10^{-19}$.

Experimental Example 6

Experimental Example 6 was carried out by using a ball-on-disk system high-frequency reciprocating rig (HFRR) as shown in FIG. 1.

Here, Experimental Example 6 was carried out in the similar conditions as in Experimental Example 1 except that the ball 20 side (sliding surface side) of the high-carbon chromium bearing steel (SUJ2) was coated by titanium nitride in some cases.

With regard to eight kinds of samples (No. 1 to No. 8 in the following Table 1) used in Experimental Example 6, combinations of the substrate 10 and the lubricant are shown in the following Table 5.

TABLE 5

| | Ball | Disk | | Lubricating oil | |
|---|---|---|---|---|---|
| | test | test piece | | | Friction |
| No. | piece | Substrate | Coating | Kind | controller |
| 1 | SUJ2 | SUJ2 | — | CD | — |
| 2 | SUJ2 | SUJ2 | TiN | CD | — |
| 3 | SUJ2 | SUJ2 | — | CD | MoDTC |
| 4 | SUJ2 | SUJ2 | TiN | CD | MoDTC |
| 5 | SUJ2 | SUJ2 | — | VDS-4 (DH-2) | — |
| 6 | SUJ2 | SUJ2 | TiN | VDS-4 (DH-2) | — |
| 7 | SUJ2 | SUJ2 | — | VDS-4 (DH-2) | MoDTC |
| 8 | SUJ2 | SUJ2 | TiN | VDS-4 (DH-2) | MoDTC |

Figure 5:
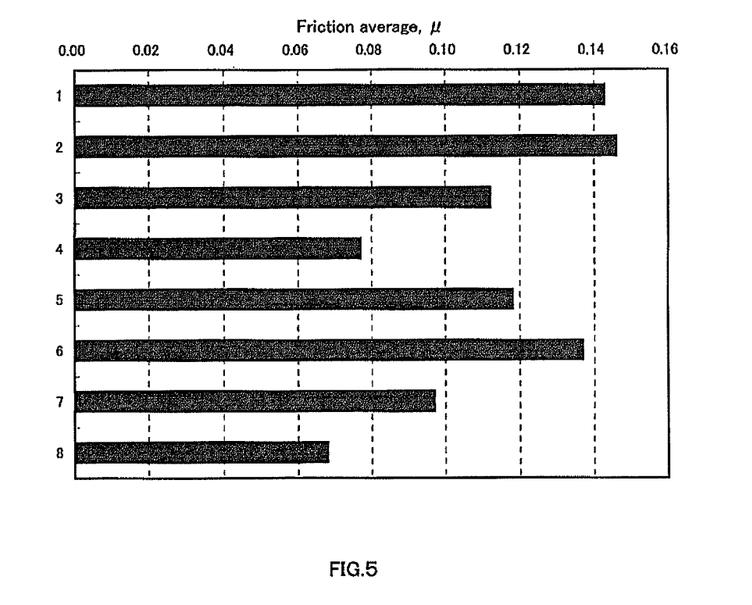
FIG. 5 This is a figure showing friction coefficients of eight kinds of samples of Experimental Example 6 by comparing to each other.

The test results of Experimental Example 6 are shown in FIG. 5.

The horizontal axis of FIG. 5 shows a friction coefficient μ and the vertical axis shows the sample No.

In FIG. 5, when Samples No. 1 and No. 2, and Sample No. 5 and Sample No. 6 are compared to each other, it can be understood that, when titanium nitride is coated to the substrate 10, the friction is remarkable (u is large) and the lubricating performances are inferior as compared to the case where no titanium nitride is not coated.

To the contrary, the results of Sample No. 4 and No. 8 are compared with the results of other samples in FIG. 5, it can be understood that the friction becomes markedly small (μ is markedly small) and the lubricating performances are remarkably improved when molybdenum dithiocarbamate (MoDTC) is added to the diesel engine and the substrate 10 is coated by titanium nitride.

When molybdenum dithiocarbamate (MoDTC) has been added to the diesel engine and when the substrate 10 is coated by titanium nitride, even when a general diesel engine oil which contains a large amount of a detergent dispersant is used as a lubricant, it can be estimated that the detergent dispersant does not inhibit the diesel engine oil to which molybdenum dithiocarbamate (MoDTC) has been added from forming a lubricating film, and a lubricating film of the diesel engine oil to which molybdenum dithiocarbamate (MoDTC) has been added is formed and the lubricating performances are exhibited, whereby the friction coefficient μ is lowered.

Incidentally, in FIG. 5, when the samples No. 1 and No. 3, and No. 5 and No. 7 are compared to each other, low friction property where molybdenum dithiocarbamate (MoDTC) has been added can be confirmed.

Figure 6:
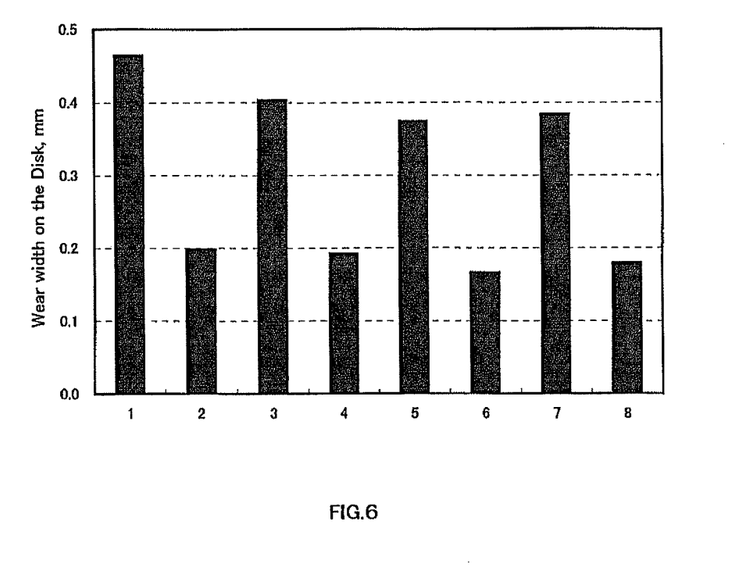
FIG. 6 This is a figure showing wear amounts of eight kinds of samples of Experimental Example 6 by comparing to each other.

FIG. 6 shows wear amounts generated at the substrate 10 side after Experimental Example 6 was carried out by comparison.

At the vertical axis of FIG. 6, a width (mm) of wear scar generated at the substrate 10 side, and at the horizontal axis, Sample No. is shown. Here, the width (mm) of wear scar generated at the substrate 10 side is proportional to the wear amount.

In FIG. 6, when the samples (No. 2, No. 4, No. 6 and No. 8) in which titanium nitride has been coated are compared with the samples (No. 1, No. 3, No. 5 and No. 7) in which it has not been coated, the wear amounts are clearly lowered.

From FIG. 6, it is clear that the wear resistance is improved when titanium nitride is coated.

Experimental Example 7

In Experimental Example 7, a lubricant to which no molybdenum dithiocarbamate (MoDTC) is added (VDS4 (DH-2): "DH-2" is a standard of Japanese Automotive Standards Organization) and a lubricant, to which molybdenum dithiocarbamate with molybdenum in the amount of 700 ppm has been added (VDS4 (DH-2)+MoDTC), were prepared. Said lubricant {VDS4 (DH-2)} is a usual diesel engine oil.

A substrate constituted by a high-carbon chromium bearing steel (SUJ2) to which no titanium nitride has been coated and a substrate (TiN) to which titanium nitride has been coated were prepared.

In Experimental Example 7, the following four kinds of samples were prepared.

No. 7-1: Combination of a lubricant {VDS4 (DH-2)} to which no molybdenum dithiocarbamate has been added and a substrate (SUJ2) to which no titanium nitride has been coated.

No. 7-2: Combination of a lubricant {VDS4 (DH-2)+MoDTC} to which molybdenum dithiocarbamate has been added and a substrate to which no titanium nitride has been coated.

No. 7-3: Combination of a lubricant {VDS4 (DH-2)} to which no molybdenum dithiocarbamate has been added and a substrate (TiN) to which titanium nitride has been coated.

No. 7-4: Combination of a lubricant {VDS4 (DH-2)+MoDTC} to which molybdenum dithiocarbamate has been added and a substrate (TiN) to which titanium nitride has been coated.

By changing the lubricating conditions, low friction performances were compared in the same manner as in Experimental Example 6.

The lubricating conditions were determined in the range of a mixed lubrication region using the Sommerfeld number as a standard in the same manner as in Experimental Example 2 of the first embodiment.

The term regarding the viscosity in the Sommerfeld number S is converted into "Pa·s", the term regarding the speed into "the frequency (s-1)" and the term regarding the load into "the mean Hertzian stress (Pa)", whereby it is obtained.

The Sommerfeld numbers S were set in the same manner as in Experimental Example 2 of the first embodiment,
$S=2.12365\times10^{-20}$,
$S=9.03526\times10^{-20}$,
$S=2.12365\times10^{-19}$,
$S=3.6141\times10^{-19}$, and
$S=5.94509\times10^{-19}$.

In Experimental Example 7, experiment was carried out under the lubricating conditions larger than the Sommerfeld number S of $S=5.94509\times10^{-19}$.

The results of Experimental Example 7 were the same as the results (see FIG. 4) of Experimental Example 2 of the first embodiment.

That is, at the Sommerfeld numbers S of "$2.12365\times10^{-19}$", "$3.6141\times10^{-19}$" and "$5.94509\times10^{-19}$", the friction coefficient μ of the sample No. 7-4 was lower than the friction coefficient μ of the sample No. 7-1, the friction coefficient μ of the sample No. 7-2 and the friction coefficient μ of the sample No. 7-3, so that it could be confirmed that the low friction performances in the combination of the lubricant to which molybdenum dithiocarbamate had been added and the titanium nitride coating. When the Sommerfeld number S was smaller than "$2.12365\times10^{-19}$", the friction coefficient μ of the sample No. 7-2 was smaller than the friction coefficient μ of the sample No. 7-4.

From the results mentioned above, the lubricating conditions in which the low friction performances in combination of the lubricant to which molybdenum dithiocarbamate had been added and the titanium nitride coating has been confirmed are only the region in which the Sommerfeld number S is larger than "$2.12365\times10^{-19}$".

It can be estimated that if the Sommerfeld number S is smaller than "$2.12365\times10^{-19}$", the properties in the category of dry friction causing solid contact would be strongly reflected than that in the category of boundary friction at which the lubricant forms a lubricating film.

In Experimental Example 7, in the region of the Sommerfeld number S larger than "$5.94509\times10^{-19}$", the difference between the friction coefficient μ of the sample No. 7-4 and the friction coefficients μ of the samples No. 7-1, No. 7-2 and No. 7-3 was extremely small.

In other words, in Experimental Example 6, the lubricating conditions in which low friction performances have been significantly confirmed in combination of the lubricant to which molybdenum dithiocarbamate had been added and the titanium nitride coating were the region in which the Sommerfeld number S was smaller than "$5.94509\times10^{-19}$".

If the Sommerfeld number S is larger than "$5.94509\times10^{-19}$", it would be belonging to the category of the so-called "fluid friction", so that it can be estimated that the low friction performances in combination of the lubricant to which molybdenum dithiocarbamate had been added and the titanium nitride coating could not be performed. When it belongs to the category of the fluid friction, a sufficient amount of the lubricant exists between the sliding surfaces but no membrane is formed.

From Experimental Example 7, it can be confirmed that the low friction performances in combination of the lubricant to which molybdenum dithiocarbamate had been added and the titanium nitride coating are performed in the range of the Sommerfeld number S of $2.12365\times10^{-19} \leq S \leq 5.94509 - 10^{-19}$.

Experimental Example 8

By using the lubricant (VDS4 10W30+MoDTC) to which molybdenum dithiocarbamate had been added and the substrate (TiAlN) on which titanium nitride aluminum had been coated, whether the low friction performances are performed or not was tested in the same conditions as in Experiment Example 1 except for making the Sommerfeld number S "$2.12365\times10^{-19}$" and changing the amount of the molybdenum dithiocarbamate (MoDTC) with molybdenum in the amount in the range of 500 to 1100 ppm to each 100 ppm.

From the results of Experimental Example 7, as in Experimental Example 3 (see Table 2), the amount of the molybdenum dithiocarbamate of 500 ppm in the molybdenum amount did not show the friction-lowering effect. The amount of the molybdenum dithiocarbamate of 600 ppm in the molybdenum amount showed the friction-lowering effect but it was inferior to the friction-lowering effects in the cases of the molybdenum amounts of 600 ppm to 1000 ppm. It was confirmed that the amount of the molybdenum dithiocarbamate should be 600 ppm or more in the molybdenum amount.

The friction coefficient μ in the case where the added amount of molybdenum dithiocarbamate was 1000 ppm in the molybdenum amount and the friction coefficient μ in the case where the added mount was 1100 ppm in the molybdenum amount were not so different from each other, and it was confirmed that the friction-lowering effect by the lubricant and the added amount of molybdenum dithiocarbamate cannot be obtained in increasing the friction-lowering effect if the added amount of molybdenum dithiocarbamate exceeds 1000 ppm in the molybdenum amount.

From Experiment Example 8, the friction-lowering effect can be confirmed with the added molybdenum dithiocarbamate with molybdenum in the amount of 600 to 1000 ppm without causing increase in the cost.

Experimental Example 9

By using the lubricant {VDS4 (DH-2)+MoDTC} to which molybdenum dithiocarbamate had been added and the substrate (TiN) on which titanium nitride had been coated, whether the low friction performances are performed or not was tested in the same conditions as in Experiment Example 1 except for making the Sommerfeld number S "$2.12365 \times 10^{-19}$", adding an amount of the molybdenum dithiocarbamate (MoDTC) with molybdenum in the amount of 700 ppm and changing the arithmetic mean roughness of the substrate 10 in the range of 1.0 to 5.0 nm to each 0.5 nm.

Experimental results of Experimental Example 9 are shown in the following Table 6.

TABLE 6

| | Arithmetic mean roughness | | | | | | | | |
|---|---|---|---|---|---|---|---|---|---|
| | 1.0 | 1.5 | 2.0 | 2.5 | 3.0 | 3.5 | 4.0 | 4.5 | 5.0 |
| Low friction performance | — | — | o | o | o | o | o | x | x |

In Table 6, "o" shows that the friction coefficient was confirmed to be sufficiently low, "–" shows that measurement of the friction coefficient could not be carried out and "x" shows that the friction coefficient was large.

If the arithmetic mean roughness of the substrate 10 is smaller than 2 nm, it is estimated that a lubricant condition is in the category of fluid friction, and that measurement of the friction coefficient cannot be carried out by the device as shown in FIG. 1 in such the lubricant condition.

In other words, it can be confirmed by Experimental Example 9 that the lubricant does not belong to the category of the boundary friction which forms the lubricating film between the sliding members otherwise the arithmetic mean average roughness of the substrate 10 is 2 nm or more.

On the other hand, if the arithmetic mean roughness of the substrate 10 is smaller than 4.0 nm, it can be estimated that it could not operate as a sliding member because unevenness of the surface is large.

In other words, it can be confirmed by Experimental Example 9 that the sliding members do not operate in the condition in which the lubricant forms a lubricating film between the sliding members, otherwise the arithmetic mean average roughness of the substrate 10 is 4.0 nm or less.

Next, the third embodiment of the present invention is explained.

In the third embodiment, in the bearing structure, for example, one of the sliding members is a shaft, and titanium carbon nitride (TiCN) was coated on the peripheral surface (sliding surface) of said shaft by the physical vapor deposition (PVD) technique. The arithmetic mean roughness of the shaft surface was made 5.0 nm.

On the other hand, as the other sliding member, a bearing (at least inner race) was made from high-carbon chromium bearing steel (SUJ2).

As a lubricant, diesel engine oil of Japanese Automotive Standards Organization "DH-2", to which molybdenum dithiocarbamate (MoDTC) with molybdenum in the amount of 700 ppm, was used.

Such bearing was used under the sliding conditions (mixed lubricating region) of the Sommerfeld number of $2.12365 \times 10^{-19}$. Here, the Sommerfeld number is a numerical value in which the viscosity is converted to Pa·s, the speed to $s^{-1}$, and the load to mean Hertzian stress (Pa).

As a result, such bearing was markedly decreased in the friction coefficient as compared with the case where the sliding both members are high-carbon chromium bearing steel (SUJ2), lubricating with diesel oil (DH-2) to which no molybdenum dithiocarbamate (MoDTC) had been added and used under the sliding conditions (mixed lubricating region) of the Sommerfeld number of $2.12365 \times 10^{-19}$.

Experimental Example 10

Experimental Example 10 was carried out by using a ball-on-disk system high-frequency reciprocating rig (HFRR) as shown in FIG. 1.

Here, Experimental Example 10 was carried out in the similar conditions as in Experimental Example 1 and Experimental Example 6 except that the ball 20 side (sliding surface side) of the high-carbon chromium bearing steel (SUJ2) was coated by titanium carbon nitride in some cases.

With regard to eight kinds of samples (No. 1 to No. 8 in the following Table 7) used in Experimental Example 10, combinations of the substrate 10 and the lubricant are shown in the following Table 7.

TABLE 7

| Ball | Disk | | Lubricating oil | |
|---|---|---|---|---|
| test | test piece | | | Friction |
| No. piece | Substrate | Coating | Kind | controller |
| 1 SUJ2 | SUJ2 | — | CD | — |
| 2 SUJ2 | SUJ2 | TiCN | CD | — |
| 3 SUJ2 | SUJ2 | — | CD | MoDTC |
| 4 SUJ2 | SUJ2 | TiCN | CD | MoDTC |
| 5 SUJ2 | SUJ2 | — | VDS-4 (DH-2) | — |
| 6 SUJ2 | SUJ2 | TiCN | VDS-4 (DH-2) | — |
| 7 SUJ2 | SUJ2 | — | VDS-4 (DH-2) | MoDTC |
| 8 SUJ2 | SUJ2 | TiCN | VDS-4 (DH-2) | MoDTC |

Figure 7:
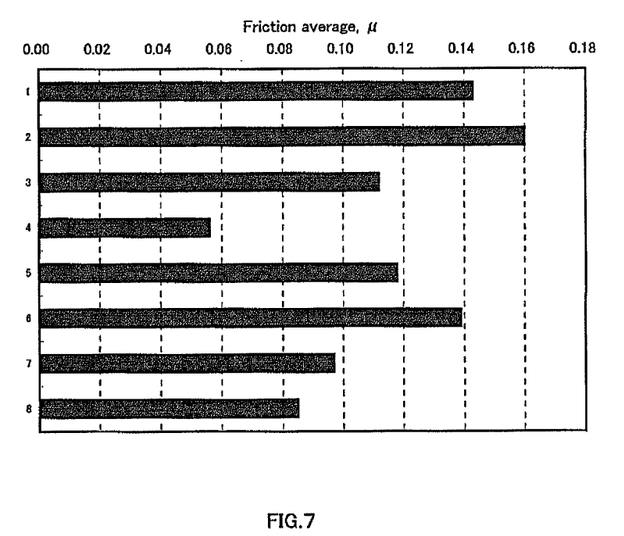
FIG. 7 This is a figure showing friction coefficients of eight kinds of samples of Experimental Example 10 by comparing to each other.

The test results of Experimental Example 10 are shown in FIG. 7.

The horizontal axis of FIG. 7 shows a friction coefficient μ and the vertical axis shows the sample No. In FIG. 7, when Samples No. 1 and No. 2, and Sample No. 5 and Sample No. 6 are compared to each other, it can be understood that, in either of two kinds of diesel engines, if no molybdenum dithiocarbamate (MoDTC) is added, the samples (No. 2 and No. 6) in which titanium carbon nitride has been coated to the substrate 10 are larger friction (μ is large) and inferior in the lubricating performances to the samples (No. 1 and No. 5) in which titanium carbon nitride has not been coated to the substrate 10.

From the results, it can be understood that the lubricating performance is lowered when titanium carbon nitride is coated in the case (general case) where molybdenum dithiocarbamate is not added to diesel engine.

To the contrary, the results of Sample No. 4 and No. 8 are compared with the results of other samples in FIG. 7, it can be understood that the friction becomes markedly small (μ is markedly small) and the lubricating performances are remarkably improved when molybdenum dithiocarbamate (MoDTC) is added to the diesel engine and the substrate 10 is coated by titanium carbon nitride.

When molybdenum dithiocarbamate (MoDTC) has been added to the diesel engine and when the substrate 10 is coated by titanium carbon nitride, even when a general diesel engine oil which contains a large amount of a detergent dispersant is used as a lubricant, it can be estimated that the detergent dispersant does not inhibit the diesel engine oil to which molybdenum dithiocarbamate (MoDTC) has been added from forming a lubricating film, and a lubricating film of the diesel engine oil to which molybdenum dithiocarbamate (MoDTC) has been added is formed and the lubricating performances are exhibited, whereby the friction coefficient μ is lowered.

Incidentally, in FIG. 7, when the samples No. 1 and No. 3, and No. 5 and No. 7 are compared to each other, low friction property where molybdenum dithiocarbamate (MoDTC) has been added can be confirmed.

Figure 8:
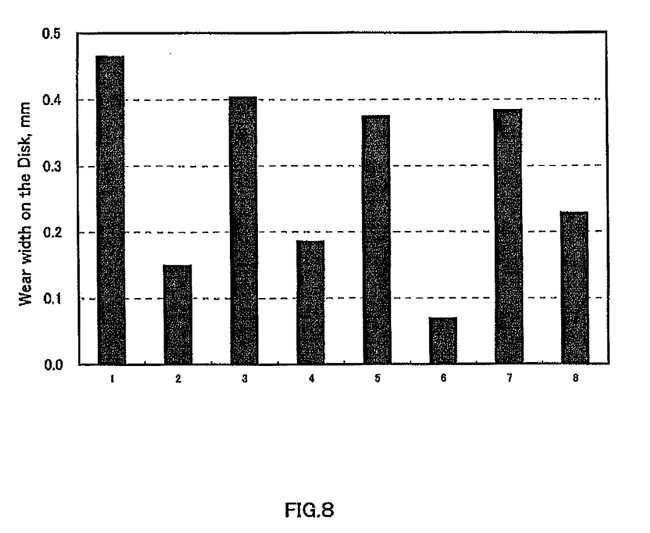
FIG. 8 This is a figure showing wear amounts of eight kinds of samples of Experimental Example 10 by comparing to each other.

FIG. 8 shows wear amounts generated at the substrate 10 side after Experimental Example 10 was carried out by comparison.

At the vertical axis of FIG. 8, a width (mm) of wear scar generated at the substrate 10 side, and at the horizontal axis, Sample No. is shown. Here, the width (mm) of wear scar generated at the substrate 10 side is proportional to the wear amount.

In FIG. 8, when the samples (No. 2, No. 4, No. 6 and No. 8) in which titanium carbon nitride has been coated are compared with the samples (No. 1, No. 3, No. 5 and No. 7) in which it has not been coated, the wear amounts are clearly lowered.

From FIG. 8, it is clear that the wear resistance is improved when titanium carbon nitride is coated.

Experimental Example 11

In Experimental Example 11, a lubricant to which no molybdenum dithiocarbamate (MoDTC) is added (VDS4 (DH-2): "DH-2" is a standard of Japanese Automotive Standards Organization) and a lubricant, to which molybdenum dithiocarbamate with molybdenum in the amount of 700 ppm has been added (VDS4 (DH-2)+MoDTC), were prepared. Said lubricant {VDS4 (DH-2)} is a usual diesel engine oil.

A substrate constituted by a high-carbon chromium bearing steel (SUJ2) to which no titanium carbon nitride has been coated and a substrate (TiN) to which titanium carbon nitride has been coated were prepared.

In Experimental Example 11, the following four kinds of samples were prepared.

No. 11-1: Combination of a lubricant {VDS4 (DH-2)} to which no molybdenum dithiocarbamate has been added and a substrate (SUJ2) to which no titanium carbon nitride has been coated.

No. 11-2: Combination of a lubricant {VDS4 (DH-2)+ MoDTC} to which molybdenum dithiocarbamate has been added and a substrate to which no titanium carbon nitride has been coated.

No. 11-3: Combination of a lubricant {VDS4 (DH-2)} to which no molybdenum dithiocarbamate has been added and a substrate (TiCN) to which titanium carbon nitride has been coated.

No. 11-4: Combination of a lubricant {VDS4 (DH-2)+ MoDTC} to which molybdenum dithiocarbamate has been added and a substrate (TiCN) to which titanium carbon nitride has been coated.

By changing the lubricating conditions, low friction performances were compared in the same manner as in Experimental Example 10.

The lubricating conditions were determined in the range of a mixed lubrication region using the Sommerfeld number as a standard in the same manner as in Experimental Example 2 of the first embodiment and Experimental Example 7 of the second embodiment.

The term regarding the viscosity in the Sommerfeld number S is converted into "Pa·s", the term regarding the speed into "the frequency (s-1)" and the term regarding the load into "the mean Hertzian stress (Pa)", whereby it is obtained.

The Sommerfeld numbers S were set in the same manner as in Experimental Example 2 of the first embodiment and Experimental Example 7 of the second embodiment, $S=2.12365 \times 10^{-20}$,
$S=9.03526 \times 10^{-20}$,
$S=2.12365 \times 10^{-19}$,
$S=3.6141 \times 10^{-19}$, and
$S=5.94509 \times 10^{-19}$.

In Experimental Example 11, experiment was carried out under the lubricating conditions larger than the Sommerfeld number S of $S=5.94509 \times 10^{-19}$.

The results of Experimental Example 11 were the same as the results (see FIG. 4) of Experimental Example 2 of the first embodiment and Experimental Example 7 of the second embodiment.

That is, at the Sommerfeld numbers S of "$2.12365 \times 10^{-19}$", "$3.6141 \times 10^{-19}$" and "$5.94509 \times 10^{-19}$", the friction coefficient μ of the sample No. 11-4 was lower than the friction coefficient μ of the sample No. 11-1, the friction coefficient μ of the sample No. 11-2 and the friction coefficient μ of the sample No. 11-3, so that it could be confirmed that the low friction performances in the combination of the lubricant to which molybdenum dithiocarbamate had been added and the titanium carbon nitride coating. When the Sommerfeld number S was smaller than "$2.12365 \times 10^{-19}$", the friction coefficient μ of the sample No. 11-2 was smaller than the friction coefficient μ of the sample No. 11-4.

From the results mentioned above, the lubricating conditions in which the low friction performances in combination of the lubricant to which molybdenum dithiocarbamate had been added and the titanium carbon nitride coating has been confirmed are only the region in which the Sommerfeld number S is larger than "$2.12365 \times 10^{-19}$".

It can be estimated that if the Sommerfeld number S is smaller than "$2.12365 \times 10^{-19}$", the properties in the category of dry friction causing solid contact would be strongly reflected than that in the category of boundary friction at which the lubricant forms a lubricating film.

In Experimental Example 11, in the region of the Sommerfeld number S larger than "5.94509×10$^{-19}$", the difference between the friction coefficient μ of the sample No. 11-4 and the friction coefficients μ of the samples No. 11-1, No. 11-2 and No. 11-3 was extremely small.

In other words, in Experimental Example 11, the lubricating conditions in which low friction performances have been significantly confirmed in combination of the lubricant to which molybdenum dithiocarbamate had been added and the titanium carbon nitride coating were the region in which the Sommerfeld number S was smaller than "5.94509×10$^{-19}$".

If the Sommerfeld number S is larger than "5.94509×10$^{-19}$", it would be belonging to the category of the so-called "fluid friction", so that it can be estimated that the low friction performances in combination of the lubricant to which molybdenum dithiocarbamate had been added and the titanium carbon nitride coating could not be performed. When it belongs to the category of the fluid friction, a sufficient amount of the lubricant exists between the sliding surfaces but no membrane is formed.

From Experimental Example 11, it can be confirmed that the low friction performances in combination of the lubricant to which molybdenum dithiocarbamate had been added and the titanium carbon nitride coating are performed in the range of the Sommerfeld number S of $2.12365 \times 10^{-19} \leq S \leq 5.94509 \times 10^{-19}$.

Experimental Example 12

By using the lubricant (VDS4 10W30+MoDTC) to which molybdenum dithiocarbamate had been added and the substrate (TiCN) on which titanium carbon nitride had been coated, whether the low friction performances are performed or not was tested in the same conditions as in Experiment Example 1 except for making the Sommerfeld number S "2.12365×10$^{-19}$" and changing the amount of the molybdenum dithiocarbamate (MoDTC) in the range of 500 to 1100 ppm in the molybdenum amount to each 100 ppm.

From the results of Experimental Example 12, as in Experimental Example 3 (see Table 2) and Experimental Example 7, the amount of the molybdenum dithiocarbamate with molybdenum in the amount of 500 ppm did not show the friction-lowering effect. The amount of the molybdenum dithiocarbamate of 600 ppm in the molybdenum amount showed the friction-lowering effect but it was inferior to the friction-lowering effects in the cases of the molybdenum amounts of 600 ppm to 1000 ppm. It was confirmed that the amount of the molybdenum dithiocarbamate should be 600 ppm or more in the amount of molybdenum.

The friction coefficient μ in the case where the added amount of molybdenum dithiocarbamate was 1000 ppm in the molybdenum amount and the friction coefficient μ in the case where the added mount was 1100 ppm in the molybdenum amount were not so different from each other, and it was confirmed that the friction-lowering effect by the lubricant and the added amount of molybdenum dithiocarbamate cannot be obtained in increasing the friction-lowering effect if the added amount of molybdenum dithiocarbamate exceeds 1000 ppm in the molybdenum amount.

From Experiment Example 12, the friction-lowering effect can be confirmed with the added amount of molybdenum dithiocarbamate of 600 to 1000 ppm in the molybdenum amount without causing increase in the cost.

Experimental Example 13

By using the lubricant {VDS4 (DH-2)+MoDTC} to which molybdenum dithiocarbamate had been added and the substrate (TiN) on which titanium nitride had been coated, whether the low friction performances are performed or not was tested in the same conditions as in Experiment Example 10 except for making the Sommerfeld number S "2.12365×10$^{-19}$", adding an amount of the molybdenum dithiocarbamate (MoDTC) with molybdenum in the amount of 700 ppm and changing the arithmetic mean roughness of the substrate 10 in the range of 1 to 4 nm to each 0.5 nm.

Experimental results of Experimental Example 13 are the same as the experimental results of Experimental Example 4 of the first embodiment (see Table 3).

That is, if the arithmetic mean roughness of the substrate 10 is smaller than 2 nm, it is estimated that a lubricant condition is in the category of fluid friction, and that measurement of the friction coefficient cannot be carried out by the device as shown in FIG. 1 in such the lubricant condition. In other words, it can be confirmed by Experimental Example 13 that the lubricant does not belong to the category of the boundary friction in which the lubricating film forms between the sliding members, otherwise the arithmetic mean average roughness of the substrate 10 is 2 nm or more.

Experimental Example 14

By using the lubricant {VDS4 (DH-2)+MoDTC} to which molybdenum dithiocarbamate had been added and the substrate (TiAlN) on which titanium carbon nitride had been coated, whether the low friction performances are performed or not was tested in the same conditions as in Experiment Example 1 except for making the Sommerfeld number S "2.12365×10$^{-19}$", an amount of the molybdenum dithiocarbamate (MoDTC) 700 ppm in terms of the molybdenum amount and changing the arithmetic mean roughness of the substrate 10 in the range of 8.0 to 11.0 nm to each 0.5 nm.

The results of Experimental Example 14 are the same as the experimental results of Experimental Example 5 of the first embodiment (see Table 4).

That is, if the arithmetic mean roughness of the substrate 10 is larger than 10.0 nm, the low friction performances were not performed. It can be estimated that it could not operate as a sliding member if unevenness of the surface is large.

In other words, it can be confirmed by Experimental Example 14 that it cannot act as the sliding members which operate in the condition of the boundary friction in which the lubricant forms the lubricating film between the sliding members, otherwise the arithmetic mean average roughness of the substrate 10 is 10.0 nm or less.

The above-mentioned embodiments are merely shown as examples and do not intend to limit the technical scope of the present invention.

For example, in the embodiments shown in the drawings, the ball 20 which is an opposite member of the substrate 10 the sliding surface of which has been coated by chromium nitride is made of a high-carbon chromium bearing steel (SUJ2). However, according to the experiments carried out by the inventor, when the ball 20 is constituted by a ferrous material in which the carbon amount is 0.15 to 0.55% by weight, hardening and tempering treatments has been carried out and carbonizing treatment has been carried out, the same results as in those shown in the drawing, Experimental Example 1 and Experimental Example 2 can be obtained.

Accordingly, the ferrous material in which the carbon amount is 0.15 to 0.55% by weight, hardening, tempering and carbonizing treatments have been carried out may be used in place of the high-carbon chromium bearing steel (SUJ2).

Also in the embodiment, the bearing is exemplified but it is as a matter of course that the present invention can be applied to the other sliding members.

EXPLANATION OF REFERENCE NUMERALS

10 ... 10
20 ... 20
P ... Load
F ... Direction to which the friction acts

The invention claimed is:

1. A sliding mechanism, comprising:
a plurality of sliding members made of a steel material,
wherein at least one sliding surface of at least one sliding member of the plurality of sliding members is coated by a titanium nitride-based material,
wherein a diesel engine oil to which molybdenum dithiocarbamate has been added with molybdenum in an amount of at least 600 ppm and at most 1000 ppm is interposed between the plurality of sliding members as a lubricant,
wherein an arithmetic mean roughness of the plurality of sliding members is of at least 2 nm and at most 10 nm, and
wherein lubricating conditions are such that a Sommerfeld number is at least $2.12365 \times 10^{-19}$ and at most $5.94509 \times 10^{-19}$, upon converting a viscosity thereof to Pa·s, a speed to $s^{-1}$, and a load to mean Hertzian stress (Pa).

2. The sliding mechanism according to claim 1, wherein said titanium nitride material is titanium nitride aluminum.

3. The sliding mechanism according to claim 1, wherein said titanium nitride material is titanium nitride and an arithmetic mean roughness of the plurality of sliding members is at least 2 nm and at most 4 nm.

4. The sliding mechanism according to claim 1, wherein said titanium nitride material is titanium carbon nitride.

5. A method for reducing friction of a sliding mechanism, comprising the steps of:
coating a titanium nitride-based material on at least one sliding surface of a plurality of sliding members made of a steel material;
adding molybdenum dithiocarbamate with molybdenum in an amount of at least 600 ppm and at most 1000 ppm to a diesel engine oil;
interposing the diesel engine oil between the plurality of sliding members as a lubricant,
setting an arithmetic mean roughness of the plurality of sliding members to at least 2 nm and at most 10 nm; and
setting lubricating conditions such that a Sommerfeld number is at least $2.12365 \times 10^{-19}$ and at most $5.94509 \times 10^{-19}$, upon converting a viscosity thereof to Pa·s, a speed to $s^{-1}$, and a load to mean Hertzian stress (Pa).

6. The method for reducing friction according to claim 5, wherein said titanium nitride material is titanium nitride aluminum.

7. The method for reducing friction according to claim 5, wherein said titanium nitride material is titanium nitride and an arithmetic mean roughness of the plurality of sliding members is at least 0.2 nm and at most 4 nm.

8. The method for reducing friction according claim 5, wherein said titanium nitride material is titanium carbon nitride.

* * * * *